US006083345A

United States Patent [19]

Frank

[11] Patent Number: 6,083,345

[45] Date of Patent: Jul. 4, 2000

[54] TOOL FOR REMOVING ADHESIVE RESIDUES OR THE LIKE FROM SUBSTRATES

[75] Inventor: Uwe Frank, Windischenbach, Germany

[73] Assignee: Adolf Wurth GmbH & Co. KG, Kuenzelsau, Germany

[21] Appl. No.: 09/133,501

[22] Filed: Aug. 12, 1998

[30] Foreign Application Priority Data

Aug. 19, 1997 [DE] Germany ........................ 297 14 823 U

[51] Int. Cl.[7] ........................ B32B 35/00

[52] U.S. Cl. ........................ 156/584; 156/344; 15/3.53; 15/424; 451/259

[58] Field of Search ........................ 156/344, 584, 156/154; 7/100, 124; 15/3.53, 424, 425, 426; 451/59, 259

[56] References Cited

U.S. PATENT DOCUMENTS

| | | | |
|---|---|---|---|
| 1,941,840 | 1/1934 | Kelsey | 32/13 |
| 3,431,573 | 3/1969 | Frandsen | 15/98 |
| 3,562,968 | 2/1971 | Johnson et al. | 451/521 |
| 4,055,897 | 11/1977 | Brix | 433/166 |
| 4,177,611 | 12/1979 | Carr-Rolllett | 51/376 |
| 4,758,392 | 7/1988 | Collins et al. | 156/73.5 X |
| 4,772,201 | 9/1988 | Johnsen et al. | 433/134 |
| 4,780,035 | 10/1988 | Shibayama et al. | 156/73.5 X |
| 5,259,914 | 11/1993 | Fisher | 156/584 |
| 5,269,874 | 12/1993 | Winter | 156/584 |

FOREIGN PATENT DOCUMENTS

| | | |
|---|---|---|
| 3600809 A1 | 7/1987 | Germany . |
| 3917345 A1 | 11/1990 | Germany . |
| 4444496 A1 | 6/1996 | Germany . |

OTHER PUBLICATIONS

European Search Report dated Oct. 8, 1999 for 98115575.7–2302.

German search report in Appln. No. 297 14 823.0, dated Jun. 29, 1998.

FEIN–Hochleistungs–Elektrowerkzeuge, 1991, S. 125–128.

Industriewerkzeuge und Zubehör, Atlas Copco, 6/92, S. 95–118.

*Primary Examiner*—Mark A. Osele
*Attorney, Agent, or Firm*—Quarles & Brady LLP

[57] ABSTRACT

A tool for removing adhesive residues, films or the like from a metal surface contains a shank, which can be rotated by a drive mechanism. A disk made from rubber or a plastics material is clamped in non-rotary manner to the shank.

12 Claims, 1 Drawing Sheet

TOOL FOR REMOVING ADHESIVE RESIDUES OR THE LIKE FROM SUBSTRATES

Figure 1:
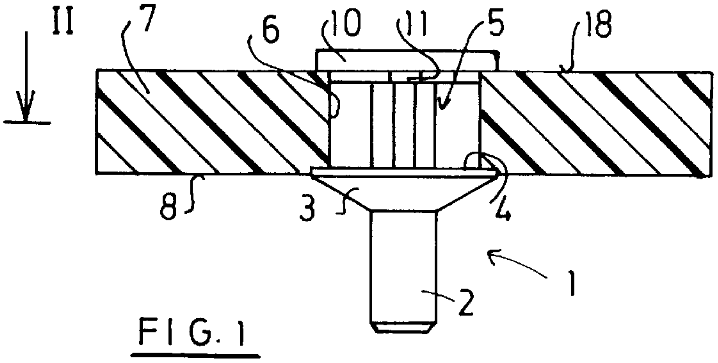

The invention relates to a tool enabling adhesive residues, films, coatings, etc. to be removed from substrates, particularly metal surfaces.

Such a tool is already known (U.S. Pat. No. 5259914), in which a tool shank is screwed to a flat metal disk. The disk has circumferential notches and is embedded in a flat disk made from a flexible plastic. The notches are necessary, so that the flexible plastic is driven during rotation. On all sides the metal disk is surrounded by the flexible plastic. The tool is clamped in a rotary drive and used in such a way that the circumferential surface of the flexible rubber disk is pressed against the surface with the material to be removed. Heating occurs and as a result the material is removed. The rubber disk thereby becomes worn.

The problem of the invention is to provide a tool of the aforementioned type, which can be more easily manufactured.

According to the invention this problem is solved by a tool having the features of claim 1. Further developments of the invention form the subject matter of the subclaims.

The tool according to the invention has the advantage that there is no need for embedding a metal part in the flat disk. Thus, the rubber disk subject to wear when the tool is in use can be separately manufactured and subsequently connected to the shank and clamping means. The rubber disk can be replaced when it becomes worn.

In particular, it is possible for the disk to have a central opening passing between the two flat sides, through which the clamping means can be joined to the shank. This central opening can be produced very easily during the manufacture of the disk.

The rotary drive between the shank and the disk can e.g. take place in that the clamping means is firmly clamped to the shank, whilst interposing the central part of the disk. It is e.g. also conceivable for the shank and the clamping means to be bonded to the flat sides of the disk in the central area thereof.

However, the invention more particularly proposes that the disk opening be so constructed that it diverges from a circular shape.

It is also possible for the part of the clamping means and/or the shank passing through the disk opening to diverge from the circular shape and in particular have a shape corresponding to that of the disk opening. Thus, in this case, in the tool rotation direction a positive engagement is obtained between the shank and the clamping means on the one hand and the flexible disk on the other. This leads to an improved driving of the disk on rotation.

According to a further development of the invention, the shank has a bearing surface running at right angles to its rotation axis and against which the disk is clamped. This bearing surface increases the contact surfaces between the shank and the flexible disk, which also improves torque transmission on driving.

According to a further development, the clamping means can also have a bearing surface running at right angles to the tool rotation axis and against which the disk is clamped.

It can in particular be provided that the clamping means has a clamping disk, whose one side forms the bearing surface. The flexible disk can then be clamped between the two bearing surfaces.

According to a further development, the clamping disk can be screwed to the shank. For this purpose, the screw can be constructed in one piece on the clamping disk, or in other words use is made of a screw having a very large head in the radial direction.

It is also possible to use a separate screw, which passes through an opening in the clamping disk. More particularly, use can be made of a countersunk screw.

It is also possible for the shank to have a threaded portion, on which the clamping disk is screwed.

In particular, the opening of the disk and/or the part of the clamping means and/or shank passing through the opening can have the shape of an impeller or a multi-element star wheel.

Further features, details and advantages of the invention can be gathered from the claims, whose wording is made by reference into content of the description, the following description of a preferred embodiment and the attached drawings, wherein show:

FIG. 1 A section through the tool.

Figure 2:
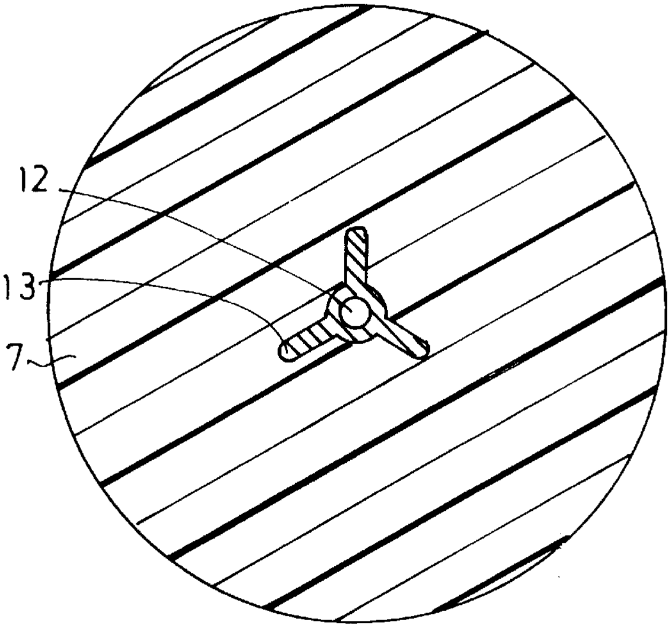

FIG. 2 A section through the tool of FIG. 1 along the sectional plane

Figure 3:
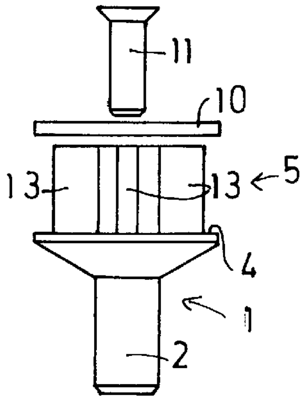

FIG. 3 A side view of the shank and the clamping means in the disassembled state.

Figure 4:
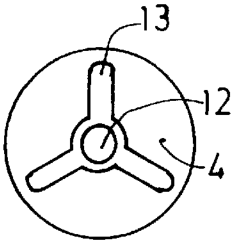

FIG. 4 A plan view of the shank in FIG. 3.

FIG. 1 is a view of the tool, in which the soft or flexible rubber disk is cut. The tool contains a shank 1, which has at its lower free end in FIG. 1, a smooth, cylindrical shank portion 2. With said shank portion 2 the tool shank 1 can be inserted in a drive mechanism, e.g. a drill or a screw-driver. However, other reception modes for the shank 1 are possible. To the smooth, cylindrical shank portion 2 is connected a shallow conical disk 3, which forms a flat, circular flange 4 around an axis of the shank 1. A portion 5 of the shank 1 is connected to the planar flat side 4 and is in the form of an impeller with three blades or vanes. This portion 5 of the tool shank 1 passes through an identically shaped opening 6 of the flexible rubber disk 7. One flat side 8 of the disk 7 engages on the planar flat side 4 of the shallow conical disk 3. To the free end of the disk 5 is screwed a clamping means, which contains a flat and in particular metallic disk 10. The metallic disk 10 contains a central opening through which passes a screw 11.

The screw 11 is screwed into a central tapped hole 12 of the shank 1. As a result of the tightening of the screw 11, the clamping disk 10 has a flange portion that is clamped against the upper flat side 18 of the flexible disk 7 in FIG. 1. Thus, through the tightening of the screw 11, the disk 7 is clamped between the surface 4 of the tool shank 1 and the clamping disk 10.

FIG. 2 shows in a cross-section through the tool of FIG. 1, the shape of the tool shank portion 5 with the three blades 13 of the tool shank portion 5 constructed in the form of an impeller. The opening 6 has the same shape, so that the portion 5 with its three blades 13 engages in the corresponding, radially directed parts of the opening 6 of the disk 7. This provides a good possibility for driving the disk 7.

These details can be gathered from FIG. 3, which shows the tool shank 1 from the same direction as in FIG. 1. Two of the blades 13 can be seen to the right and left, whereas the third blade is represented in front view. The screw 11, in the represented embodiment a countersunk screw, is passed through the central opening of the clamping disk 10 and is screwed into the tapped hole 12 in the rotation axis.

FIG. 4 is a plan view of the tool shank, from the top in FIG. 3. The three blades 13, which extend radially outwards from the core of the portion 5 containing the tapped hole 12, are uniformly circumferentially distributed and do not extend entirely up to the circumference of the planar flat side 4.

In the case of the represented tool, the blades 13 of portion 5 are located on the tool shank. It is obviously also possible to construct the portion 5 with the blades 13 on the clamping means and to then screw the latter to the disk 3 of the tool shank 1. It is also possible for the core of the shank 1 having the blades 13 not to be hollow and instead to have a cone-like end provided with an external thread and which is then screwed into the central opening of the clamping disk 10, which is provided with a thread.

In the represented embodiment, the tool shank 1 and clamping means 9 are made from metal. However, it is naturally also possible to use a plastics material, but the latter must be relatively rigid, so as to permit the torque transmission from the drive mechanism.

What is claimed is:

1. A tool for removing adhesive residues or films from surfaces, including a metal surface, the tool comprising:

a shank which is connectable to a drive mechanism to be rotated by said drive mechanism, and a plurality of blades extending laterally from and cooperating with said shank;

a disk made of a flexible material having top and bottom sides, said disk having a central opening extending between the top and bottom sides, said central opening having a shape complementary to a cross section of the shank and the blades so as to closely receive the shank and blades without intervening parts; and clamping means for holding the disk in position on the shank with the central opening receiving the shank and the blades.

2. A tool according to claim 1, wherein the opening of the disk has a non-circular shape.

3. A tool according to claim 1, wherein a portion of the shank and the blades passing through the opening of the disk has a non-circular shape.

4. A tool according to claim 2, wherein said clamping means is formed by opposing flanges, one flange being integral with the shank and another flange being attachable to the shank to clamp the disk between the opposing flanges.

5. A tool according to claim 4, wherein the flange integral with the shank has a bearing surface at right angles to an axis of rotation of the shank.

6. A tool according to claim 4, wherein the clamping means has a bearing surface perpendicular to an axis of rotation of the tool.

7. A tool according to claim 4, wherein the flange attachable to the shank has one side forming a bearing surface bearing against the disk.

8. A tool according to claim 7, wherein the flange attachable to the shank is screwed to the shank.

9. A tool according to claim 8, wherein the screw is constructed in one piece on the flange attachable to the shank.

10. A tool according to claim 8, wherein a separate screw is provided, particularly a countersunk screw.

11. tool according to claim 1, wherein the shank passing through the opening of the disk has a non-circular shape.

12. A tool according to claim 1, wherein the opening of the disk is in the form of a multi-element star wheel or an impeller.

* * * * *